(12) United States Patent
McCann et al.

(10) Patent No.: US 11,678,175 B2
(45) Date of Patent: Jun. 13, 2023

(54) METHOD OF CHANGING A MAC ADDRESS OF A WLAN AFFILIATED STA OF A MULTI-LINK DEVICE

(71) Applicants: Stephen McCann, Rownhams (GB); Michael Montemurro, Toronto (CA); Kwok Shum Au, Ottawa (CA); Sheng Sun, Ottawa (CA)

(72) Inventors: Stephen McCann, Rownhams (GB); Michael Montemurro, Toronto (CA); Kwok Shum Au, Ottawa (CA); Sheng Sun, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 135 days.

(21) Appl. No.: 17/335,004

(22) Filed: May 31, 2021

(65) Prior Publication Data
US 2022/0386109 A1    Dec. 1, 2022

(51) Int. Cl.
*H04W 8/26* (2009.01)
*H04W 84/12* (2009.01)

(52) U.S. Cl.
CPC ............... *H04W 8/26* (2013.01); *H04W 84/12* (2013.01)

(58) Field of Classification Search
CPC ................................ H04W 8/26; H04W 84/12
See application file for complete search history.

(56) References Cited

U.S. PATENT DOCUMENTS

| | | | |
|---|---|---|---|
| 2016/0219522 A1* | 7/2016 | Asterjadhi | H04W 52/0274 |
| 2021/0014776 A1 | 1/2021 | Patil et al. | |
| 2021/0029588 A1 | 1/2021 | Cariou et al. | |
| 2021/0112543 A1 | 4/2021 | Das et al. | |
| 2021/0367872 A1* | 11/2021 | Huang | H04L 43/10 |

FOREIGN PATENT DOCUMENTS

| | | |
|---|---|---|
| EP | 2557817 A1 | 2/2013 |
| WO | 2021003181 A1 | 1/2021 |

OTHER PUBLICATIONS

IEEE P802.11be / D1.0—Draft standard for information technology—Telecommunications and information exchange between systems Local and metropolitan area networks—Specific requirements May 2021.
IEEE Standard for Information Technology—Telecommunications and Information Exchange between Systems—Local and Metropolitan Area Networks—Specific Requirements—Part 11: Wireless LAN Medium Access Control (MAC) and Physical Layer (PHY) Specifications Dec. 3, 2020.

* cited by examiner

*Primary Examiner* — Mohammad S Anwar

(57) ABSTRACT

A method of changing a MAC address of a WLAN affiliated STA of a multi-link device (MLD) and related system, device and non-transitory machine-readable storage medium. A new MAC address is generated for an affiliated non-AP STA of a non-AP MLD. A request to change the MAC address of the affiliated non-AP STA to the new MAC address is sent from the non-AP MLD to an AP MLD. An acknowledgement that the new MAC address for the affiliated non-AP STA of the non-AP MLD has been successfully applied by the AP MLD is received by the non-AP MLD from the AP MLD. The MAC address for the affiliated non-AP STA of the non-AP MLD is changed to the new MAC address in response to the acknowledgment.

20 Claims, 7 Drawing Sheets

|  | Category | Address Update Action | Dialog Token | Number of Links | MLO Link |
|---|---|---|---|---|---|
| Octets: | 1 | 1 | 1 | 1 | variable |

FIG. 6

|  | LinkID | MAC Address |
|---|---|---|
| Octets: | 1 | 6 |

FIG. 7

|  | Category | Address Update Action | Dialog Token | Status |
|---|---|---|---|---|
| Octets: | 1 | 1 | 1 | 1 |

FIG. 8

|  | Category | Address Update Action | Dialog Token | Status |
|---|---|---|---|---|
| Octets: | 1 | 1 | 1 | 1 |

FIG. 9

METHOD OF CHANGING A MAC ADDRESS OF A WLAN AFFILIATED STA OF A MULTI-LINK DEVICE

TECHNICAL FIELD

The present disclosure relates to communications, and more specifically, to a method of changing a MAC address of a WLAN affiliated STA of a multi-link device.

BACKGROUND

The Extremely High Throughput (EHT) Task Group (TG) has recently started standardization activities within the IEEE 802.11 WLAN project and this TG is known as IEEE 802.11be. IEEE 802.11be has introduced a multi-link device. A multi-link device (MLD) is a logical wireless local area network (WLAN) entity that has multiple radio links to another MLD entity. A typical use case would be an MLD Access Point (AP) connecting to a non-AP MLD (e.g., a WLAN terminal or handset) using 2 WLAN radio links in the 2.4 GHz and 5 GHz WLAN bands. The individual WLAN radio links are referred to as links and the radios within the AP MLD are referred to as affiliated APs. It is intended that each of the affiliated APs can also serve latency non-AP stations (STAs). For example, an AP MLD with a 2.4 GHz radio link could also behave as a legacy AP serving a legacy 802.11ax non-AP STA. In this case, the source of the 2.4 GHz radio link is the affiliated AP within the AP MLD. The radios within the non-AP MLD are referred to as affiliated stations (STAs).

The operation of an MLD is different from that of two logical STAs (a multiband client) in the same physical entity (e.g., two non-AP STAs in the same handset). Within an MLD the traffic is coordinated between the two links and the security association is maintained across them. This provides some benefits over a logical (or virtual) STA. An MLD has more than one affiliated station and has a single medium access control (MAC) service access point (SAP) to logical link control (LLC), which includes one MAC data service. An MLD may communicate by parallel transmission on a plurality of WLAN radio links between an AP MLD and a non-AP MLD. An AP MLD is an MLD in which each STA affiliated with the MLD is an affiliated AP. A non-AP MLD is an MLD in which each STA affiliated with the MLD is an affiliated STA. An MLD allows traffic to flow on any WLAN radio link with the MLD AP and provides a performance gain by using a plurality of channels.

IEEE 802.11 allows a STA to establish a level of privacy for a user (e.g., not be tracked by a third party) by changing its MAC address at a periodic interval. However, the MAC address of an affiliated STA should not be changed through the lifetime of an association (i.e. when there is a security association between the non-AP MLD and the AP MLD) or during a fast transition (FT), thereby limiting privacy for users.

SUMMARY

The present disclosure provides a method of changing a MAC address of a WLAN affiliated STA of a multi-link device and related system, device and non-transitory machine-readable storage medium.

An MLD behaves similarly to a legacy STA when connecting to an AP to participate in a LAN. To maintain LAN connectivity, a STA MAC address can only be changed when the IEEE 802.11 STA is unassociated, in other words, when there is no security association between the STA and an AP. The present disclosure provides a method of changing a MAC address of an affiliated STA of a non-AP MLD, used by the affiliated STA and the affiliated AP of an AP MLD to which the non-AP MLD is associated, without changing the MAC address used by the AP MLD on a LAN that the AP MLD has joined and without affecting LAN connectivity of the AP MLD. This is possible because the MAC address of the affiliated STA is not visible on the LAN. The MAC address of a non-AP MLD is used on the LAN but is not used to transmit frames over-the-air. An affiliated STA MAC address is used to transmit frames over-the-air using a specific link. Therefore, the affiliated STA address for a non-AP MLD could change without affecting LAN connectivity. Furthermore, as no MLD security is bound to the affiliated STA, the MAC address can be changed without affecting any security bindings. This enables the MAC address of the affiliated STA to be changed, even though the non-AP MLD is associated. Each of the affiliated STAs of the non-AP MLD may periodically change their MAC addresses. Non-AP MLDs can inform the AP MLDs that they have a security association with that the MAC addresses of their affiliated STAs are about to change. The AP MLDs can respond with an acknowledgement message, which may optionally indicate any error situation to the non-AP MLD. Thus, the method of the present disclosure allows user privacy to be maintained for non-AP MLDs through the lifetime of an association and during FT, by changing on a periodic basis the MAC address used over-the-air for each affiliated STA, without affecting LAN connectivity. Without the method of the present disclosure, non-AP MLDs limit privacy of users, through the tracking of a static MAC address of their affiliated STAs once a security association is made. In accordance some embodiments of the present disclosure, an non-AP MLD can request a MAC address change for more than one affiliated non-AP STA. Conversely, in other embodiments of the present disclosure an affiliated non-AP STA can trigger a MAC address change request for itself and other affiliated non-AP STAs within a common non-AP MLD entity, or a MAC address change request of an affiliated non-AP STA can trigger the non-AP MLD entity to trigger the other affiliated non-AP STAs to request their MAC addresses to change.

In accordance with a first aspect of the present disclosure, there is provided a method of changing a medium access control (MAC) address of a wireless local area network (WLAN) affiliated non-access point station (non-AP STA) of a non-AP multi-link device (MLD), the non-AP MLD comprising a plurality of affiliated non-AP STAs. A new MAC address is generated for an affiliated non-AP STA of a non-AP MLD. A request to change the MAC address of the affiliated non-AP STA to the new MAC address is sent from the non-AP MLD to an AP MLD. An acknowledgement that the new MAC address for the affiliated non-AP STA of the non-AP MLD has been successfully applied by the AP MLD is received by the non-AP MLD from the AP MLD. The MAC address for the affiliated non-AP STA of the non-AP MLD is changed to the new MAC address in response to the acknowledgment.

In some or all examples of the first aspect, the method further comprises: sending, by the non-AP MLD to the AP MLD, a confirmation that the MAC address of the affiliated non-AP STA of the non-AP MLD has been successfully changed.

In some or all examples of the first aspect, the confirmation causes the affiliated AP of the AP MLD to use the new MAC address mapping for the affiliated non-AP STA of the non-AP MLD.

In some or all examples of the first aspect, generating the new MAC address for the non-STA of the non-AP MLD is performed in response to detection of a trigger.

In some or all examples of the first aspect, the trigger is an expiry of a predetermined amount of time since the MAC address of the affiliated non-AP STA was set.

In some or all examples of the first aspect, the trigger is a sending of a predetermined number of frames since the MAC address of the affiliated non-AP STA was set.

In some or all examples of the first aspect, the predetermined number of frames is 1.

In some or all examples of the first aspect, the method further comprises: monitoring for one or more triggers for changing the MAC address for the affiliated non-AP STA of the non-AP MLD.

In some or all examples of the first aspect, the generating, requesting and changing is performed by the non-AP MLD.

In some or all examples of the first aspect, the generating, requesting and changing is performed by the affiliated non-AP STA of the non-AP MLD.

In some or all examples of the first aspect, the monitoring, generating and changing is performed by the non-AP MLD.

In some or all examples of the first aspect, the monitoring, generating and changing is performed by the affiliated non-AP STA of the non-AP MLD.

In some or all examples of the first aspect, the method further comprises: sending data between the affiliated non-AP STA of the non-AP MLD and the affiliated AP of the AP MLD using the new MAC address.

In some or all examples of the first aspect, the processing of the request by the AP MLD causes the AP MLD to apply the new MAC address change to a mapping of the affiliated AP of the AP MLD.

In accordance with another aspect of the present disclosure, there is provided a communication device comprising a processor, a memory and a communication subsystem. The memory having tangibly stored thereon executable instructions for execution by the processor. The executable instructions, in response to execution by the processor, cause the communication device to perform the methods described above and herein.

In accordance with a further aspect of the present disclosure, there is provided a non-transitory machine-readable storage medium having tangibly stored thereon executable instructions for execution by a processor of a communication device. The executable instructions, in response to execution by the processor, cause the communication device to perform the methods described above and herein.

Other aspects and features of the present disclosure will become apparent to those of ordinary skill in the art upon review of the following description of specific implementations of the application in conjunction with the accompanying figures.

BRIEF DESCRIPTION OF THE FIGURES

FIG. 6 is a diagram illustrating a MAC Address Change Notification frame in accordance with the present disclosure.

FIG. 7 is a diagram illustrating a MLO Link subfield format in accordance with of the present disclosure.

FIG. 8 is a diagram illustrating a MAC Address Change Acknowledgement frame in accordance with the present disclosure.

FIG. 9 is a diagram illustrating a MAC Address Change Confirmation frame in accordance with the present disclosure.

DETAILED DESCRIPTION OF EXAMPLE EMBODIMENTS

Figure 1:
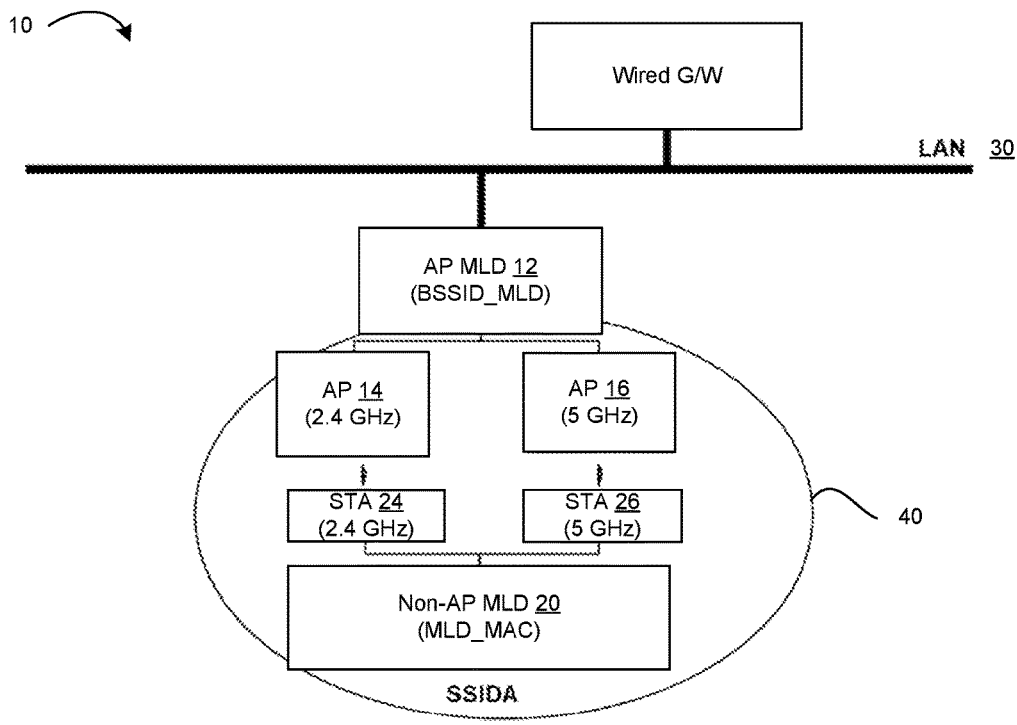
FIG. 1 is a diagram illustrating a communications system having an MLD architecture in accordance with of the present disclosure.

The present disclosure is made with reference to the accompanying drawings, in which embodiments are shown. However, many different embodiments may be used, and thus the description should not be construed as limited to the embodiments set forth herein. Rather, these embodiments are provided so that this application will be thorough and complete. Wherever possible, the same reference numbers are used in the drawings and the following description to refer to the same elements, and prime notation is used to indicate similar elements, operations or steps in alternative embodiments. Separate boxes or illustrated separation of functional elements of illustrated systems and devices does not necessarily require physical separation of such functions, as communication between such elements may occur by way of messaging, function calls, shared memory space, and so on, without any such physical separation. As such, functions need not be implemented in physically or logically separated platforms, although they are illustrated separately for ease of explanation herein. Different devices may have different designs, such that although some devices implement some functions in fixed function hardware, other devices may implement such functions in a programmable processor with code obtained from a machine-readable storage medium. Lastly, elements referred to in the singular may be plural and vice versa, except where indicated otherwise either explicitly or inherently by context.

IEEE 802.11-2020-IEEE Standard for Information Technology—Telecommunications and Information Exchange between Systems—Local and Metropolitan Area Networks—Specific Requirements—Part 11: Wireless LAN Medium Access Control (MAC) and Physical Layer (PHY) Specifications, dated December 2020, describes privacy and MAC address issues and states that MAC addresses cannot be changed through the lifetime of an association, the content of IEEE 802.11-2020 being incorporated herein by reference.

IEEE P802.11be D1.0, dated May 2021, describes state of the art information about multi-link devices (MLDs) and multi-link operation (MLO), the content of IEEE P802.11be D1.0 being incorporated herein by reference.

For convenience, the terms messages, frames and message frames may be used in the present disclosure interchangeably.

A multi-link device in the present disclosure may be a single-antenna device or a multi-antenna device. A multi-link device has one MAC address that coordinates different radios operating simultaneously. A multi-link device may have multiple radios that are capable of operating simultaneously on different channels in the same or different bands. The present disclosure is not limited to any number of antennas or radios in the multi-link device. The multi-link device may allow a service of a same access type to be transmitted on different links or even allow a same data packet to be transmitted on different links. Alternatively, services of the same access type cannot be transmitted on different links, however services of different access types can be transmitted on different links.

Referring to FIG. 1, a communications system 10 having a multi-link device architecture in accordance with the present disclosure will be described. The communications system 10 comprises an AP MLD 12 connected to a wired local area network (LAN) 30. The AP MLD 12 generates a wireless local area network (WLAN) 40 through which it communicates with a non-AP MLD 20, such as a handset. As described above, the non-AP MLD 20 supports parallel transmission on a plurality of links, providing higher transmission efficiency and higher throughput than a communication device that supports only single-link transmission. The AP MLD 12 comprises affiliated APs 14, 16 operating at, for example, 2.4 GHz and 5 GHz respectively. The non-AP MLD 20 comprises affiliated STAs 24, 26 operating at, for example, 2.4 GHz and 5 GHz respectively. A WLAN radio link (referred to as "link" hereinafter) is formed between an affiliated STA of the non-AP MLD 12 and an affiliated AP of the AP MLD 12 (e.g., a link between the affiliated STA 24 and the affiliated AP 14 or a link between the affiliated STA 26 and the affiliated AP 16). The STAs 24, 26 are logical stations that operate on separate links within one MLD.

Figure 2:
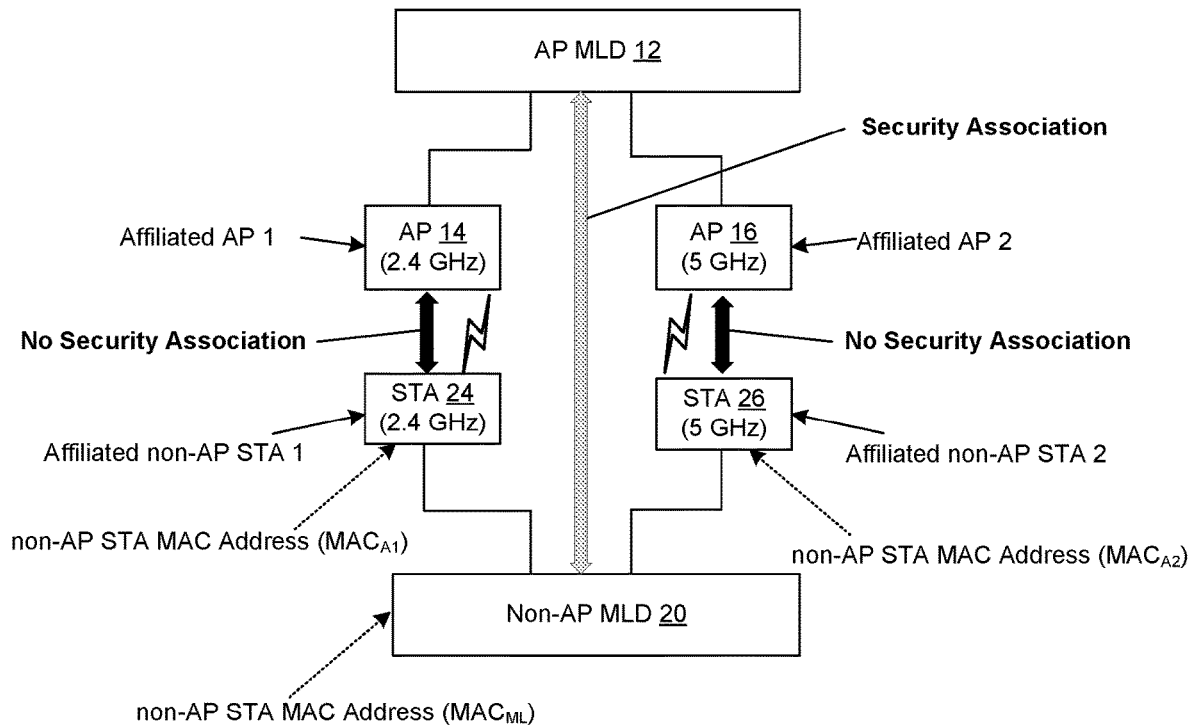
FIG. 2 is a diagram illustrating an MLD with a non-AP MAC address architecture in accordance with of the present disclosure.

Referring now to FIG. 2, an MLD with a non-AP MAC address architecture in accordance with the present disclosure will be described. The non-AP MLD 20 comprises three logical entities, the non-AP MLD 20 itself and two affiliated STAs 24, 26. The affiliated STAs 24 and 26 contain the radios and the non-AP MLD 20 contains parts of the MAC layer and the station management entity (SME) to the upper layers within the non-AP MLD 20. All three entities have a MAC address, denoted $MAC_{ML}$, $MAC_{A1}$ and $MAC_{A2}$, respectively.

A Robust Security Network Association (RSNA) may be established between the AP MLD 12 and the non-AP MLD 20. Each of the links between the AP MLD 12 and the non-AP MLD 20 is formed between an affiliated STA of the non-AP MLD 20 and an affiliated AP of the AP MLD 12. The links, comprising the affiliated STAs 24, 26 of the non-AP MLD 20, are transparent (invisible) to the MLD RSNA. Although the security associations (SA) are handled by the non-AP MLD 20, only the MAC address $MAC_{ML}$ is used as an identifier for the security associations. Correspondingly from the LAN point of view, the LAN 30 only sees the MAC address $MAC_{ML}$ at the non-AP MLD 20. The affiliated STA MAC addresses $MAC_{A1}$ and $MAC_{A2}$ are not part of the MLD security associations and are not seen by the LAN 30. When the non-AP MLD 20 connects to the AP MLD 12 to communicate in the LAN environment, the MAC address of the non-AP MLD 20, $MAC_{ML}$, represents the non-AP MLD 20 on the LAN 30.

Figure 3:
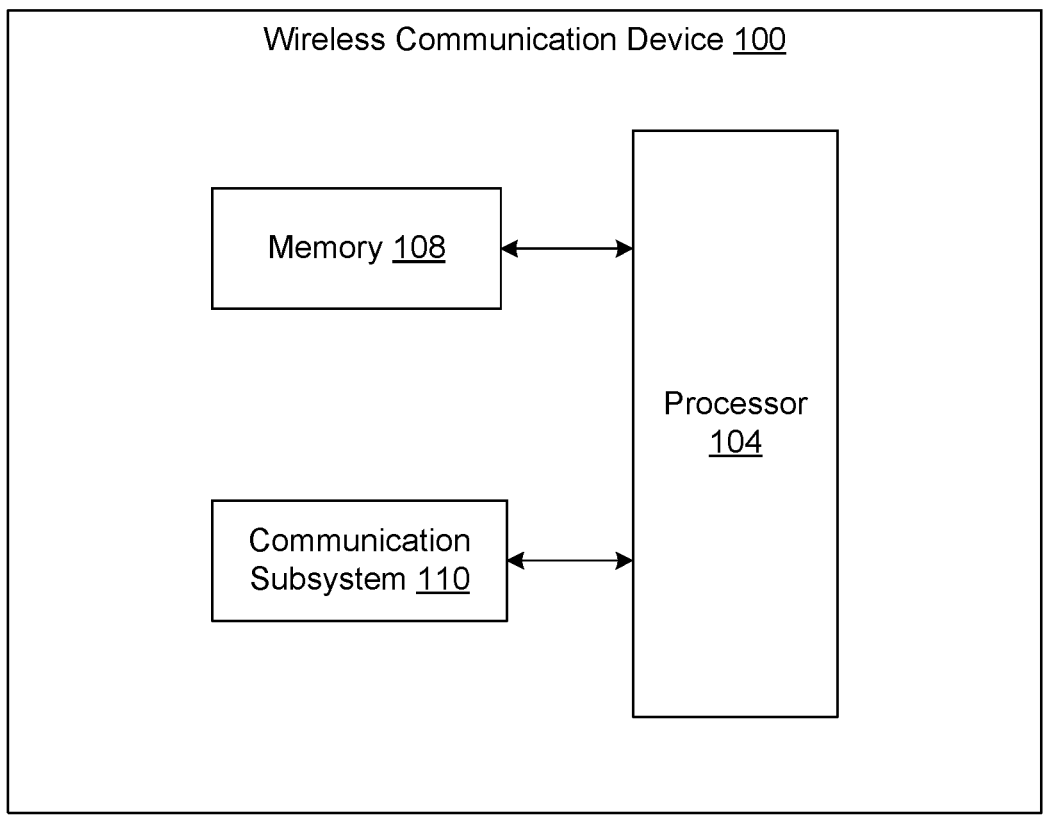
FIG. 3 is a block diagram of an example wireless communication device 100 suitable for providing an MLD suitable for practicing the teachings of the present disclosure.

FIG. 3 is a block diagram of an example wireless communication device 100 suitable for providing an MLD for practicing the teachings of the present disclosure as either the AP MLD 12 or the non-AP MLD 20. The wireless communication device 100 includes a processing system comprising a processor 104 (such as a microprocessor or central processing unit (CPU)) which controls the overall operation of the wireless communication device 100. The processing system may include one or more other types of processors coupled to the processor 104, such as a graphic processing unit (GPU), a tensor processing unit (TPU), a neural processing unit (NPU), an application specific integrated circuit, or a field programmable gate array (FPGA), for offloading certain computing tasks. The processor 104 is coupled to a plurality of components via a communication bus (not shown) which provides a communication path between the components and the processor 104. The processor 104 is coupled to one or more non-transitory machine-readable storage media ("memory") 108, which may include Random Access Memory (RAM), Read Only Memory (ROM), and persistent (non-volatile) memory such as flash memory, and a communication subsystem 110.

The communication subsystem 110 may comprise a baseband processor or other circuits for implementing a Medium Access Controller, a Physical layer, transmitting amplifiers, and RF antennas as required for communicating over a wireless medium. The communication subsystem 110 typically includes at least two stations (STAs) for exchanging radio frequency signals with the wireless local area network 40 in parallel in accordance with IEEE 802.11be. IEEE 802.11be also allows one STA to be included in the communication subsystem 110. The communication subsystem 110 may include more than two STAs in some embodiments. The STAs comprise wireless transceivers. The communication subsystem 110 may also include a wireline transceiver for wireline communications with wired networks such as the wired LAN 30. The communication subsystem 110 may also include one or a combination of a Bluetooth transceiver or other short-range wireless transceiver or a wireless wide area network (WWAN) transceiver such as a cellular transceiver for communicating with a radio access network (e.g., cellular network). The cellular transceiver may communicate with any one of a plurality of fixed transceiver base stations of the cellular network within its geographic coverage area.

The memory 108 stores a variety of instructions executable by the processing system and data, some of which may take the form of application programs executable by the processing system. Executable instructions and data, which may be in the form of system software, software modules, specific device applications, or parts thereof, may be temporarily loaded into RAM during execution. Communication signals received by the wireless communication device 100 may also be stored in RAM. Although specific functions are described for various types of memory, this is merely one embodiment, and a different assignment of functions to types of memory may be used in other embodiments.

The wireless communication device 100 may comprise an internal power supply such as a battery (not shown) as a power source, depending on the type of the wireless communication device 100. For example, the wireless communication device 100 may comprise one or more rechargeable batteries that may be charged, for example, through charging circuitry coupled to a battery interface such as a serial data port. The battery provides electrical power to at least some of the components of the wireless communication device 100, and the battery interface (not shown) provides a mechanical and electrical connection for the battery. Alternatively, the wireless communication device 100 may comprise an external power supply.

Figure 4:
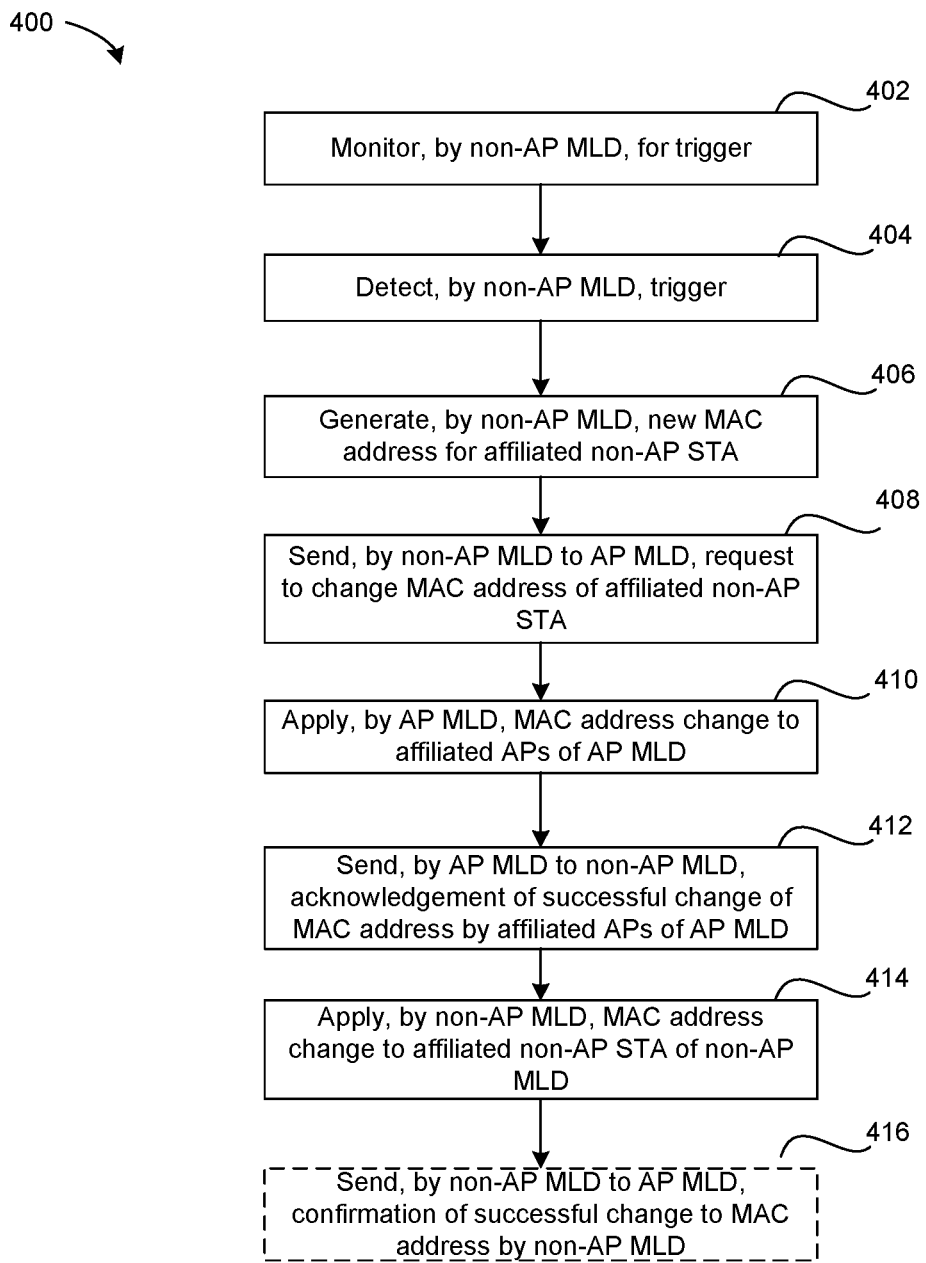
FIG. 4 is flowchart of a method of changing a MAC address of an affiliated STA in a non-AP MLD in accordance with a first embodiment of the present disclosure.
Figure 5:
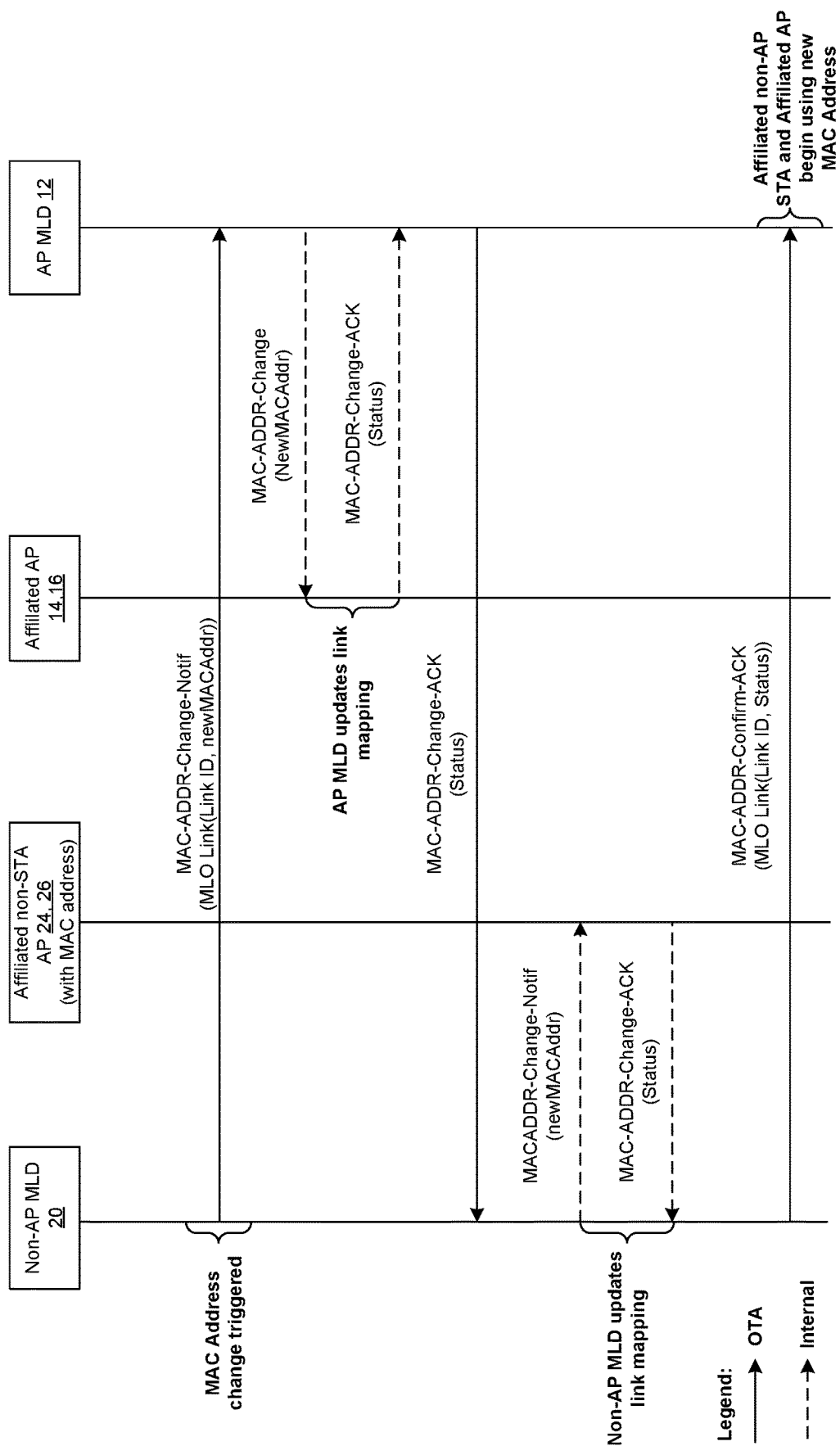
FIG. 5 is a message sequence diagram illustrating the message flow between a non-AP MLD and an AP MLD in accordance with a method of changing a MAC address of an affiliated STA in a non-AP MLD of the first embodiment of the present disclosure.

Referring now to FIGS. 4 and 5, a method 400 of changing a MAC address in accordance with a first embodiment of the present disclosure will be described. FIG. 4 is flowchart of the method 400 in accordance with the first embodiment of the present disclosure. FIG. 5 is a message sequence diagram illustrating message flow in accordance with the first embodiment of the present disclosure. The solid lines in FIG. 5 represent over-the-air (OTA) messages whereas the broken lines in FIG. 5 present internal messages with an MLD. The frames (messages) sent between MLDs can be sent over any link. The method 400 is performed by the non-AP MLD 20 and the AP MLD 12. At least parts of the method 400 may be carried out by software executed by the non-AP MLD 20 and the AP MLD 12, by the processors 104 and/or communication subsystems 110 thereof.

At operation 402, the non-AP MLD 20 monitors for a trigger to change the MAC addresses of one or more of the affiliated STAs 24, 26 from one or more predetermined triggers. The triggers may be time-based or event-based. For example, when the trigger is time-based, the trigger may be the expiry of a predetermined amount of time since the MAC address of the affiliated STA was set, such as a predetermined periodic interval. The expiry of the predetermined amount of time may be monitored by a timer, such as a countdown timer. The predetermined amount of time may be a few minutes or as a little as a few seconds. The predetermined amount of time may be configured based on a privacy setting for the non-AP MLD 20. For another example, when the trigger is event-based, the trigger may be the sending of a predetermined number of frames since the MAC address of the affiliated STA was set. The predetermined number of frames may be as little as a one frame, so that the MAC address of the non-AP MLD 20 changes every frame. The smaller the time-based or event-based interval between changes in the MAC address, the greater the privacy afforded.

At operation 404, the non-AP MLD 20 detects a trigger from the one or more predetermined triggers.

At operation 406, the non-AP MLD 20 generates new MAC addresses for one or more of the affiliated STAs 24, 26 in response to the detection of the trigger. There may be situations where not all the MAC addresses of all the affiliated STAs are changed or changed at the same time.

At operation 408, the non-AP MLD 20 notifies the AP MLD 12 of the new MAC addresses for the affiliated STAs 24, 26, for example, by sending a MAC Address Change Notification frame. An example of a MAC Address Change Notification frame is described below in connection with FIGS. 6 and 7. The MAC Address Change Notification frame is denoted in the message sequence diagram (FIG. 5) as MAC-ADDR-Change-Notif (MLO Link (Link ID, newMACAddr)$_1$, MLO Link (Link ID, newMACAddr)$_n$) for 1 . . . n, where n is the number of affiliated STAs of the non-AP MLD 20 requesting a change of MAC address, the Link ID is the identifier of the link of each affiliated STA, and newMACAddr is the proposed new MAC address.

At operation 410, the AP MLD 12 receives the MAC Address Change Notification frame from the non-AP MLD 20 and forwards the MAC address change to the affiliated APs 14, 16, instructing them to update their mapping of the affiliated STAs 24, 26 MAC addresses. In some situations, the AP MLD 12 may not forward the MAC address change to the affiliated APs, if it determines that a MAC address change is not appropriate. The forwarding of the MAC address change comprises sending a MAC Address Change frame from the AP MLD 12 to the affiliated APs 14, 16. The MAC Address Change frame is denoted in the message sequence diagram (FIG. 5) as MAC-ADDR-Change (newMACAddr), where newMACAddr is the new MAC address. The MAC Address Change frame instructs the affiliated APs 14, 16 to update their mapping of the MAC addresses for the affiliated STAs 24, 26. The applying of the MAC address change further comprises the affiliated APs 14, 16 notifying the AP MLD 12 when their link mapping of the MAC addresses for the affiliated STAs 24, 26 have been successfully changed, for example, by sending a MAC Address Change Acknowledgement frame. For example, the AP MLD 12 may respond to the non-AP MLD 20 with a status of SUCCESS, or may respond with an alternative status rather than SUCCESS, such as FAIL, when the requested MAC address changes for the affiliated STAs 24, 26 have not been applied. The MAC address change may not succeed for several reasons, for example, if the proposed MAC address is not suitable to the AP MLD 12 or the affiliated APs 14, 16 for some reason (e.g., already in use for another device). The alternative status may cause the non-AP MLD 20 to re-try the MAC address change, in which case operations proceed to operation 406. The MAC Address Change Acknowledgement frame is denoted in the message sequence diagram (FIG. 5) as MAC-ADDR-Change-ACK (Status), where Status is the status of the MAC address change, either SUCCESS or FAIL. The decision to update the link mapping of the affiliated STAs MAC addresses can be made by either the AP MLD 12 or one or more of the affiliated APs 14, 16.

At operation 412, the AP MLD 12 notifies the non-AP MLD 120 that the link mapping of the MAC address for the affiliated STA 24, 26 has been successfully changed by the affiliated APs 14, 16 of the of AP MLD 20, for example, by sending a MAC address Change Acknowledgement frame to non-AP MLD 20 notifying it that the MAC address has been applied and acknowledged by the AP MLD 12.

It will be appreciated that the AP MLD 12 may respond with a Status code stopping the MAC address change or information about how the MAC address change should be performed (e.g., provide information about the local address administration). With respect to a Status code stopping the MAC address, the MAC Address Change Acknowledgement frame can contain a status other than SUCCESS. If a status other than SUCCESS (e.g., FAIL), then the non-AP MLD 20 can attempt to determine a new address. This can occur if the AP MLD 12 detects a duplicate MAC address either on the LAN 30 or in another affiliated AP. It can also detect that the MAC address is invalid, e.g. a broadcast address. In some situations, for example in the case of an enterprise, the MAC addresses may have to fall within a certain address range and this may be a reason to refuse the address. Alternatively, the Status code may be a Status code about using a local address administration such as, for example, DENIED_LOCAL_MAC_ADDRESS_POLICY_VIOLATION. In the current standard, an AP has the ability to advertise a MAC address policy and can reject an association when the STA uses a MAC address that does not conform to the policy. With respect to information about how the MAC address change should be performed, an optional subfield such as, for example, local admin information of variable length, may be added to the MAC Address Change Acknowledgement frame (FIG. 8) to indicate information about the local address administration. In this case, the MAC Address Change Acknowledgement frame (FIG. 8) would require a leading "length" subfield so that the received frame can be correctly parsed.

At operation 414, the non-AP MLD 20 applies the MAC address change to the affiliated STAs 24, 26 in response to receiving the MAC Address Change Acknowledgement frame. The applying of the MAC address change comprises sending a MAC Address Change frame from the non-AP MLD 20 to the affiliated STAs 24, 26. This MAC Address Change frame instructs the affiliated STAs 24, 26 to update their MAC addresses affiliated STA. The applying of the MAC address change further comprises the affiliated STAs 24, 26 notifying the non-AP MLD 20 when their MAC addresses affiliated STA have been successfully changed, for example, by sending a MAC Address Change Acknowledgement frame. In some situations, the MAC address change may not be successful, and this is indicated by the status FAIL (or an alternative) within the MAC Address Change Acknowledgement frame. The non-AP MLD 20 has now completed the update of the link mapping.

At operation 416, the non-AP MLD 20 optionally notifies the AP MLD 12 that the MAC address for the affiliated STAs have been successfully changed, for example, by sending a MAC address Change Confirm frame to the AP MLD 12. The MAC Address Change Confirm frame is denoted in the message sequence diagram (FIG. 5) as MAC-ADDR-Change-Confirm (Status), where Status is the status of the MAC address change, either SUCCESS or FAIL. The MAC address Change Confirm frame may be used to complete the MAC address change and trigger the use of the new MAC addresses by the AP MLD 12 and non-AP MLD 20. The existing MAC addresses may continue to be used by the AP MLD 12 and the non-AP MLD 20 to allow MLD traffic flow, while the message sequence in FIG. 5. is being executed. Once the message sequence is complete, the new MAC addresses will be used. Therefore all entities within the MLD may store both an existing MAC address and the new MAC address until signaled to switch over.

FIG. 6 is a diagram illustrating a MAC Address Change Notification frame in accordance with the present disclosure. The MAC Address Change Notification frame is sent from the non-AP MLD 20 to the AP MLD 12 to indicate that the MAC address of an affiliated STA has requested a change. The MAC Address Change Notification frame may be an action frame, a protected action frame or an Extensible Authentication Protocol (EAP) over LAN (EAPoL) data frame similar to a Tunneled Direct Link Setup (TDLS) setup frame. Alternatively, the MAC address change may be performed over a TDLS link with the same messaging. It will be appreciated by persons skilled in the art that TDLS is a direct connection between two non-AP MLDs 20 that are associated with the same AP MLD 12. TDLS communications pass directly between the TDLS peers and do not traverse the AP. The key derivation for TDLS is bound (i.e., used in the key derivation) to the affiliated non-AP STA MAC addresses of the TDLS peers. If the MAC address change is for an affiliated STA operating in a TDLS link, the non-AP MLD 20 would negotiate the MAC address change with both the TDLS peer and the AP MLD 12. After the MAC address change negotiation has completed, the TDLS peers would negotiate a new TDLS peer key. The key derivation protocol that would be invoked is defined and well known in the art. The MAC Address change messaging would be the same.

The Category field may have a value of 30, for example, to indicate privacy. The Category field may have a value of 10 if a Wireless Network Management (WNM) Notification is used in other examples, as described below. In such other examples, the non-AP MLD 20 transmits a WNM Notification Request (category field=10; action field=26; type=3 (MLO address update) and the AP MLD 12 transmits the WNM Notification Response (category=10; action field=26; type=3 (MLO address update)—the other message elements would be the same as the MAC address change notification. The value options for the Address Update Action field are: a value of 0 to indicate that the frame is a Notification frame, a value of 1 to indicate the frame is an Acknowledgement frame, and a value of 2 to indicate that frame is a Confirm frame. The Dialog Token field may have a variable value. The dialog token is unique to a transaction and may be the same for Request/Response/Confirm frames/messages in a transaction. The Number of Links field has a value of an integer that representing the number of links. The MLO Link field is described below. FIG. 7 is a diagram illustrating a MLO Link subfield format in accordance with of the present disclosure. The Link ID subfield has a value corresponding to the link identifier of the affiliated STA's link with a MAC address. The MAC Address subfield has a value corresponding to the requested MAC address. The MAC Address Change Notification frame may be used to request the MAC address change of more than one affiliated STA, in such cases, the MAC Address Change Notification frame includes data for each of the affiliated STA with a requested MAC address change.

FIG. 8 is a diagram illustrating a MAC Address Change Acknowledgement frame in accordance with the present disclosure. The Category field may have a value of 30, for example, to indicate privacy. The Address Update Action field has a value of 1 to indicate the frame is an Acknowledgement frame. The Dialog Token field is set to the value that was received in the MAC Address Change Notification frame. The Status field has a value corresponding to a Status code acknowledging the notification, such as SUCCESS indicating a successful MAC address change or FAIL indicating an unsuccessful MAC address change.

FIG. 9 is a diagram illustrating a MAC Address Change Confirmation frame in accordance with the present disclosure. The Category field may have a value of 30, for example, to indicate privacy. The Address Update Action field has a value of 2 to indicate that frame is a Confirm frame. The Dialog Token field may have is set to the value that was received in the MAC Address Change Acknowledgement frame. The Status field has a value corresponding to a Status code acknowledging the notification, such as SUCCESS indicating a successful MAC address change or FAIL indicating an unsuccessful MAC address change.

In accordance with the method 400, pairwise transient key security association (PTKSA) establishment between the non-AP MLD 20 and the AP MLD 12 is performed by the MLD entities. The PTKSA establishment is outside the scope of the present disclosure and will not be address further herein.

As an alternative to using a new action frame or an EAPoL data frame, the MAC address change may be performed over a TDLS link with the same messaging. If the MAC address change is for an affiliated STA operating in the TDLS link, the non-AP MLD 20 would negotiate the MAC address change with both the TDLS peer and the AP MLD.

After the MAC address change negotiation has completed, the TDLS peers would negotiate a new TDLS peer key.

As a further alternative to defining a new action frame with a privacy category, Wireless Network Management (WNM) Notification request/response frames (i.e., notification/acknowledgement frames) may be used in accordance with IEEE 802.11v. The payload of the notification and acknowledgement frames would remain the same.

Figure 10:
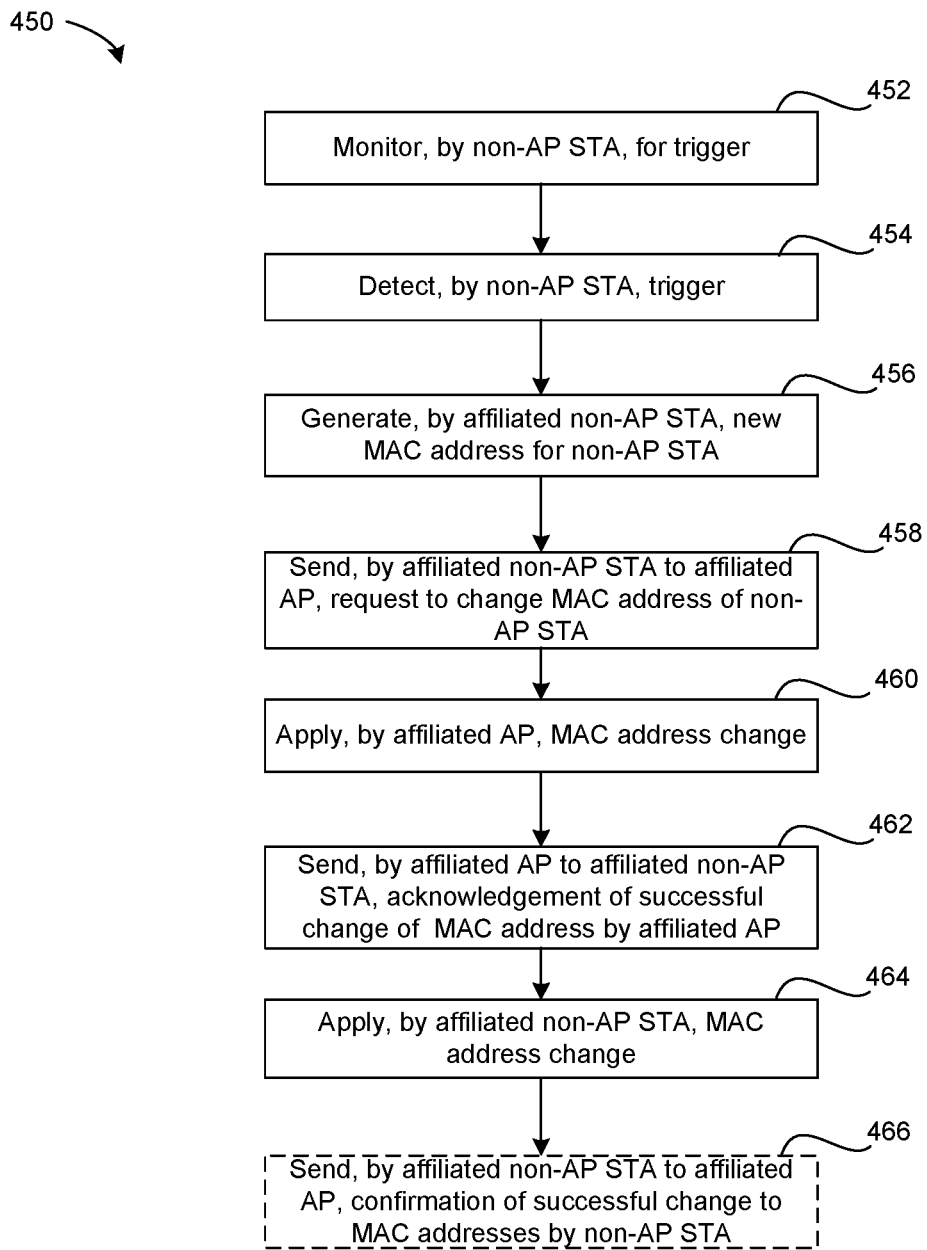
FIG. 10 is flowchart of a method of changing a MAC address of an affiliated STA in a non-AP MLD in accordance with a second embodiment of the present disclosure.
Figure 11:
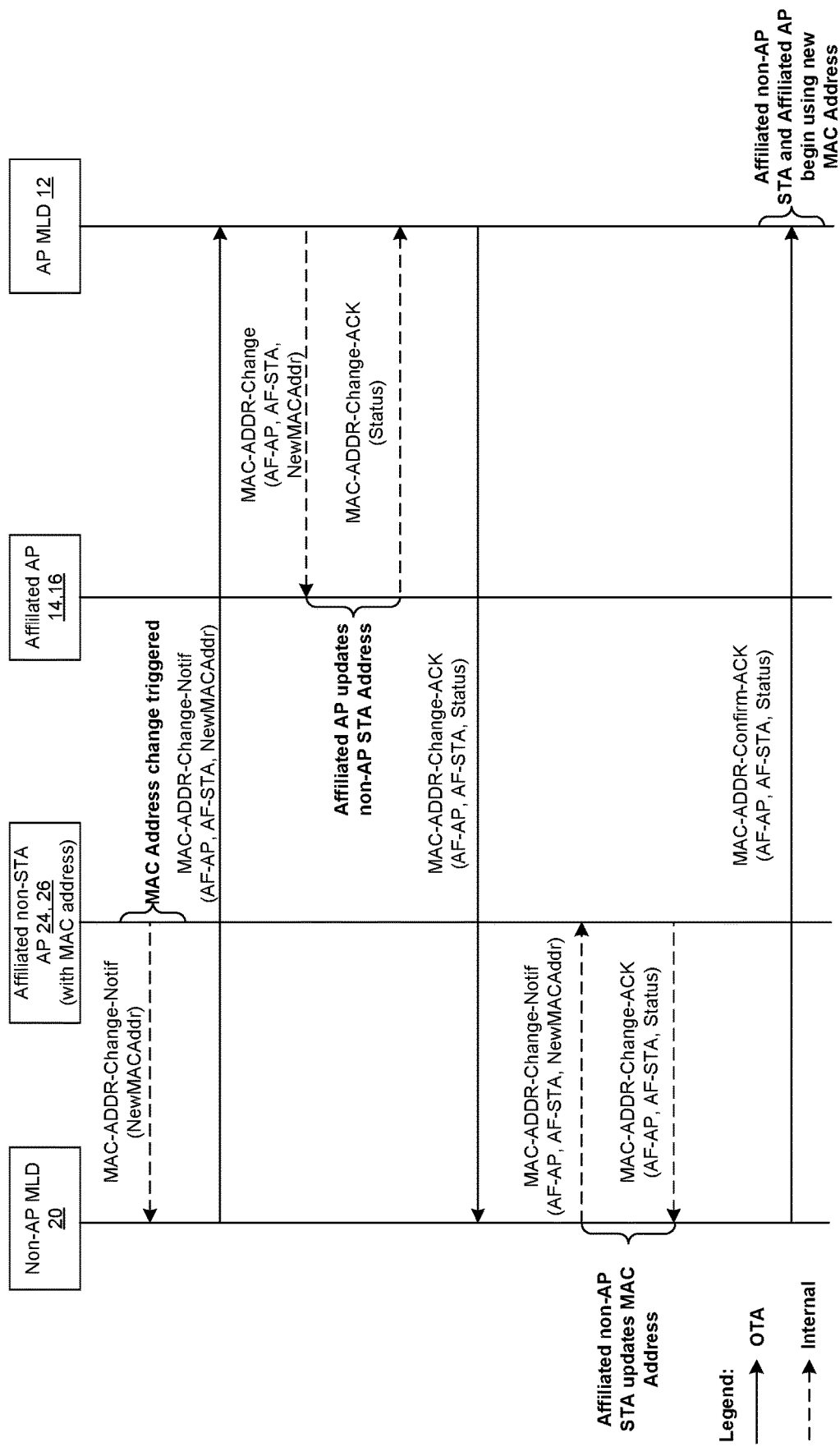
FIG. 11 is a message sequence diagram illustrating the message flow between a non-AP MLD and an AP MLD in accordance with a method of changing a MAC address of an affiliated STA in a non-AP MLD of the second embodiment of the present disclosure.

Referring now to FIGS. 10 and 11, a method 450 of changing a MAC address in accordance with a second embodiment of the present disclosure will be described. FIG. 10 is flowchart of the method 500 in accordance with the second embodiment of the present disclosure. FIG. 11 is a message sequence diagram illustrating a message flow in accordance with the second embodiment of the present disclosure. The solid lines in FIG. 11 represent OTA messages whereas the broken lines in FIG. 11 present internal messages with an MLD. The frames (messages) sent between MLDs can be sent over any link. The method 450 is performed by the non-AP MLD 20 and the AP MLD 12. At least parts of the method 400 may be carried out by software executed by the non-AP MLD 20 and the AP MLD 12, affiliated STAs of the non-AP MLD 20, affiliated APs of the AP MLD 12, by the processors 104 and/or communication subsystems 110 thereof. The second embodiment is similar to the first embodiment but differs in that an affiliated STA 24 or 26 of the non-AP MLD 20, rather than the non-AP MLD 20 itself, causes the MAC address change and notifies the corresponding affiliated AP 14 or 16 of the AP MLD 12 through the corresponding link. The method 450 appears the same or substantially similar over-the-air but differs in the internal messages between elements (e.g., stations) of the MLDs 12, 20. The PTKSA is still established between the non-AP MLD 20 and the AP MLD 12, thus the notification frames originate at the affiliated STA 24 or 26, but are transmitted as a link-specific notification to the corresponding affiliated AP 14 or 16, as described below.

At operation 452, each affiliated STAs 24, 26 of the non-AP MLD 20 monitors for a trigger to change its MAC addresses from one or more predetermined triggers. The triggers may be time-based or event-based. For example, when the trigger is time-based, the trigger may be the expiry of a predetermined amount of time, such as a predetermined periodic interval. The expiry of the predetermined amount of time may be monitored by a timer, such as a countdown timer. The predetermined amount of time may be a few minutes or as a little as a few seconds. The predetermined amount of time may be configured based on a privacy setting for the non-AP MLD 20. For another example, when the trigger is event-based, the trigger may be the sending of a predetermined number of frames. The predetermined number of frames may be as little as a one frame, so that the MAC address of the non-AP MLD 20 changes every frame. The smaller the time-based or event-based interval between changes in the MAC address, the greater the privacy afforded.

At operation 454, one of the affiliated STAs 24, 26 of the non-AP MLD 20 detects a trigger from the one or more predetermined triggers.

At operation 456, the one of the affiliated STAs 24, 26 of the non-AP MLD 20 that detected the trigger generates a new MAC address for itself and optionally one or more other affiliated STAs 24, 26 in response to the detection of the trigger. It will be appreciated the affiliated STA can generate a new MAC address for any one or more of the other affiliated STAs in the non-AP MLD 20, even though a trigger has not been detected for those affiliated STAs. An affiliated non-AP STA can trigger a MAC address change request for itself and other affiliated non-AP STAs within a common non-AP MLD entity, or a MAC address change request of an affiliated non-AP STA can trigger the non-AP MLD entity to trigger the other affiliated non-AP STAs to request their MAC addresses to change. In the present example, only the MAC address for one affiliated STA will be changed for simplicity. There may be situations where not all the MAC addresses of all the affiliated STAs are changed or changed at the same time.

At operation 458, the affiliated STA 24 or 26 of the non-AP MLD 20 notifies its corresponding affiliated AP 14 or 16 of the AP MLD 12 that it is requesting a MAC address change, for example, by sending a MAC Address Change Notification frame. The MAC Address Change Notification frame is denoted in the message sequence diagram (FIG. 11) as MAC-ADDR-Change-Notif (AF_AP, AF_STA, newMACAddr), where AF_AP, AF_STA indicates AF_AP is the destination and AF_STA is the source of the frame/message and newMACAddr is the new MAC address. For multi-link operation, an affiliated STA can communicate with an affiliated AP but cannot do so directly. Instead, the affiliated STA sends the frame through the non-AP MLD 20 to the AP MLD 12, which then sends the frame to the affiliated AP with the resulting path: Affiliated STA→non-AP MLD-→FRAME TRANSMISSION OTA→AP MLD→Affiliated AP.

At operation 460, the affiliated AP 14 or 16 receives the MAC Address Change Notification frame and applies the MAC address change to update its link mappings.

At operation 462, the affiliated AP 14 or 16 notifies the affiliated STA 24 or 26 of the non-AP MLD 20 when the link mapping of the MAC address for the affiliated STA 24 or 26 has been successfully changed, for example, by sending a MAC Address Change Acknowledgement frame. For example, the affiliated AP 14 or 16 may respond with a status of SUCCESS, or may respond with an alternative status rather than SUCCESS, such as FAIL, when the MAC address change for the affiliated STA 24 or 26 has not been applied. The MAC address may not succeed for several reasons, for example, if the proposed MAC address is not suitable for the AP MLD 12 or the affiliated AP 14 or 16 for some reason (e.g., already in use for another device). The alternative status may cause the affiliated STA 24 or 26 to re-try the MAC address change, in which case operations proceed to operation 456. The MAC Address Change Acknowledgement frame is denoted in the message sequence diagram (FIG. 11) as MAC-ADDR-Change-ACK (SUCCESS), where Status is the status of the MAC address change, either SUCCESS or FAIL. The affiliated AP sends the frame through the AP MLD 12 to the non-AP MLD 20, which then sends the frame to the affiliated STA with the resulting path: Affiliated AP→AP MLD→FRAME TRANSMISSION OTA→non-AP MLD→affiliated STA. As described above, the affiliated AP can alternatively respond with a Status code stopping the MAC address change or information about how the MAC address change should be performed.

At operation 464, the affiliated STA 24 or 26 applies the MAC address change in response to receiving the MAC Address Change Acknowledgement frame.

At operation 466, the affiliated STA 24 or 26 optionally notifies the affiliated AP 14 or 16 that the MAC address for the non-STA AP has been successfully changed, for example, by sending a MAC address Change Confirm frame to the affiliated AP 14 or 16. The affiliated STA sends the frame through the non-AP MLD 20 to the AP MLD 12, which then sends the frame to the affiliated AP with the resulting path: Affiliated STA→non-AP MLD→FRAME TRANSMISSION OTA→AP MLD→Affiliated AP. The MAC Address Change Confirm frame is denoted in the message sequence diagram (FIG. 11) as MAC-ADDR-Change-Confirm (AF-AP, AF-STA, Status), where Status is the status of the MAC address change, either SUCCESS or FAIL. The MAC address Change Confirm frame may be used to complete the MAC address change and trigger the use of the new MAC address by the affiliated AP 14 or 16 and the affiliated STA 24 or 26, and the AP MLD 12 and non-AP MLD 20.

Although the foregoing embodiments related to a WLAN, it is complemented that the teachings of the present disclosure may be extended to a WWAN such as a cellular network.

The steps and/or operations in the flowcharts and drawings described herein are for purposes of example only. There may be many variations to these steps and/or operations without departing from the teachings of the present disclosure. For instance, the steps may be performed in a differing order, or steps may be added, deleted, or modified, as appropriate.

General

The coding of software for carrying out the above-described methods described is within the scope of a person of ordinary skill in the art having regard to the present disclosure. Machine-readable code executable by one or more processors of one or more respective devices to perform the above-described method may be stored in a machine-readable storage medium such as the memory of the data manager. The terms "software" and "firmware" are interchangeable within the present disclosure and comprise any computer program stored in memory for execution by a processor, comprising Random Access Memory (RAM) memory, Read Only Memory (ROM) memory, EPROM memory, electrically EPROM (EEPROM) memory, and non-volatile RAM (NVRAM) memory. The above memory types are examples only, and are thus not limiting as to the types of memory usable for storage of a computer program.

All values and sub-ranges within disclosed ranges are also disclosed. Also, although the systems, devices and processes disclosed and shown herein may comprise a specific plurality of elements, the systems, devices and assemblies may be modified to comprise additional or fewer of such elements. Although several example embodiments are described herein, modifications, adaptations, and other implementations are possible. For example, substitutions, additions, or modifications may be made to the elements illustrated in the drawings, and the example methods described herein may be modified by substituting, reordering, or adding steps to the disclosed methods.

Features from one or more of the above-described embodiments may be selected to create alternate embodiments comprised of a subcombination of features which may not be explicitly described above. In addition, features from one or more of the above-described embodiments may be selected and combined to create alternate embodiments comprised of a combination of features which may not be explicitly described above. Features suitable for such combinations and subcombinations would be readily apparent to persons skilled in the art upon review of the present disclosure as a whole.

In addition, numerous specific details are set forth to provide a thorough understanding of the example embodiments described herein. It will, however, be understood by those of ordinary skill in the art that the example embodiments described herein may be practiced without these specific details. Furthermore, well-known methods, procedures, and elements have not been described in detail so as not to obscure the example embodiments described herein. The subject matter described herein and in the recited claims intends to cover and embrace all suitable changes in technology.

Although the present disclosure is described at least in part in terms of methods, a person of ordinary skill in the art will understand that the present disclosure is also directed to the various elements for performing at least some of the aspects and features of the described methods, be it by way of hardware, software or a combination thereof. Accordingly, the technical solution of the present disclosure may be embodied in a non-volatile or non-transitory machine-readable storage medium (e.g., optical disk, flash memory, etc.) having stored thereon executable instructions tangibly stored thereon that enable a processing device to execute examples of the methods disclosed herein.

The term "database" may refer to either a body of data, a relational database management system (RDBMS), or to both. As used herein, a database may comprise any collection of data comprising hierarchical databases, relational databases, flat file databases, object-relational databases, object-oriented databases, and any other structured collection of records or data that is stored in a computer system. The above examples are example only, and thus are not intended to limit in any way the definition and/or meaning of the terms "processor" or "database".

The present disclosure may be embodied in other specific forms without departing from the subject matter of the claims. The described example embodiments are to be considered in all respects as being only illustrative and not restrictive. The present disclosure intends to cover and embrace all suitable changes in technology. The scope of the present disclosure is, therefore, described by the appended claims rather than by the foregoing description. The scope of the claims should not be limited by the embodiments set forth in the examples, but should be given the broadest interpretation consistent with the description as a whole.

The invention claimed is:

1. A method of changing a medium access control (MAC) address of a wireless local area network (WLAN) affiliated non-access point station (non-AP STA) of a non-AP multi-link device (MLD), the non-AP MLD comprising a plurality of affiliated non-AP STAs, the method comprising:
   generating a new MAC address for an affiliated non-AP STA of the non-AP MLD;
   sending, by the non-AP MLD to an AP MLD, a request to change the MAC address of the affiliated non-AP STA of the non-AP MLD to the new MAC address;
   receiving, by the non-AP MLD from the AP MLD, an acknowledgement that the new MAC address for the affiliated non-AP STA of the non-AP MLD has been successfully applied by the AP MLD; and
   changing the MAC address for the affiliated non-AP STA of the non-AP MLD to the new MAC address in response to the acknowledgment.

2. The method of claim 1, further comprising:
   sending, by the non-AP MLD to the AP MLD, a confirmation that the MAC address of the affiliated non-AP STA of the non-AP MLD has been successfully changed.

3. The method of claim 2, wherein the confirmation causes an affiliated AP of the AP MLD to use the new MAC address mapping for the affiliated non-AP STA of the non-AP MLD.

4. The method of claim 1, wherein generating the new MAC address for the non-AP STA of the non-AP MLD is performed in response to detection of a trigger.

5. The method of claim 4, wherein the trigger is an expiry of a predetermined amount of time since the MAC address of the affiliated non-AP STA was set.

6. The method of claim 4, wherein the trigger is a sending of a predetermined number of frames since the MAC address of the affiliated non-AP STA was set.

7. The method of claim 6, wherein the predetermined number of frames is 1.

8. The method of claim 4, further comprising:
monitoring for one or more triggers for changing the MAC address for the affiliated non-AP STA of the non-AP MLD.

9. The method of claim 8, wherein the monitoring, generating and changing is performed by the non-AP MLD.

10. The method of claim 8, wherein the monitoring, generating and changing is performed by the affiliated non-AP STA of the non-AP MLD.

11. The method of claim 1, wherein the generating, requesting and changing is performed by the non-AP MLD.

12. The method of claim 1, wherein the generating, requesting and changing is performed by the affiliated non-AP STA of the non-AP MLD.

13. The method of claim 1, further comprising:
sending data between the affiliated non-AP STA of the non-AP MLD and an affiliated AP of the AP MLD using the new MAC address.

14. The method of claim 1, wherein processing of the request by the AP MLD causes the AP MLD to apply the new MAC address change to a mapping of an affiliated AP of the AP MLD.

15. A non-access point multi-link device (non-AP MLD), comprising:
a processor;
a communication subsystem coupled to the processor, wherein the communication subsystem comprises a plurality of affiliated non-AP stations (non-AP STAB);
a memory coupled to the processor;
wherein the processor is configured to:
generate a new MAC address for an affiliated non-AP STA of the non-AP MLD;
send, by the non-AP MLD to an AP MLD, a request to change the MAC address of the affiliated non-AP STA of the non-AP MLD to the new MAC address;
receive, by the non-AP MLD from the AP MLD, an acknowledgement that the new MAC address for the affiliated non-AP STA of the non-AP MLD has been successfully applied by the AP MLD; and
change the MAC address for the affiliated non-AP STA of the non-AP MLD to the new MAC address in response to the acknowledgment.

16. The non-AP MLD of claim 15, wherein the processor is further configured to:
send, by the non-AP MLD to the AP MLD, a confirmation that the MAC address of the affiliated non-AP STA of the non-AP MLD has been successfully changed.

17. The non-AP MLD of claim 16, wherein the confirmation causes an affiliated AP of the AP MLD to use the new MAC address for the affiliated non-AP STA of the non-AP MLD.

18. The non-AP MLD of claim 15, wherein generating the new MAC address for the non-AP STA of the non-AP MLD is performed in response to detection of a trigger.

19. The non-AP MLD of claim 15, wherein processing of the request by the AP MLD causes the AP MLD to apply the new MAC address change to a mapping of an affiliated AP of the AP MLD.

20. A non-transitory machine-readable storage medium having tangibly stored thereon executable instructions for execution by a processor of an non-access point (AP) multi-link device (MLD), the non-AP MLD comprising a processor and a communication subsystem coupled to the processor, the non-AP MLD comprising a plurality of affiliated non-AP stations (STAs), wherein the executable instructions, in response to execution by the processor, cause the non-AP MLD to:
generate a new MAC address for an affiliated non-AP STA of the non-AP MLD;
send, by the non-AP MLD to an AP MLD, a request to change the MAC address of the affiliated non-AP STA of the non-AP MLD to the new MAC address;
receive, by the non-AP MLD from the AP MLD, an acknowledgement that the new MAC address for the affiliated non-AP STA of the non-AP MLD has been successfully applied by the AP MLD; and
change the MAC address for the affiliated non-AP STA of the non-AP MLD to the new MAC address in response to the acknowledgment.

* * * * *